US009465509B2

(12) United States Patent
Nancke-Krogh

(10) Patent No.: US 9,465,509 B2
(45) Date of Patent: *Oct. 11, 2016

(54) SYSTEM AND METHOD FOR UNLIMITED MULTI-USER COMPUTER DESKTOP ENVIRONMENT

(71) Applicant: MOSAIQQ, Inc., San Francisco, CA (US)

(72) Inventor: Anders Nancke-Krogh, San Francisco, CA (US)

(73) Assignee: Mosaiqq, Inc., San Francisco, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 13/874,291

(22) Filed: Apr. 30, 2013

(65) Prior Publication Data

US 2013/0290868 A1    Oct. 31, 2013

Related U.S. Application Data

(60) Provisional application No. 61/640,550, filed on Apr. 30, 2012, provisional application No. 61/790,895, filed on Mar. 15, 2013.

(51) Int. Cl.
*G06F 3/00* (2006.01)
*G06F 3/0481* (2013.01)
*G06F 9/44* (2006.01)

(52) U.S. Cl.
CPC ........... *G06F 3/0481* (2013.01); *G06F 9/4445* (2013.01)

(58) Field of Classification Search
CPC .......... H04L 12/1822; H04L 12/1813; H04L 65/1066; G09G 5/14; G06F 3/0481; G06F 9/4445
See application file for complete search history.

(56) References Cited

U.S. PATENT DOCUMENTS

| 8,682,973 B2 | 3/2014 | Kikin-Gil |
| 2002/0033839 A1 | 3/2002 | Elber |
| 2003/0145056 A1* | 7/2003 | Fujisawa ........... G06F 17/30873 709/205 |
| 2005/0086612 A1* | 4/2005 | Gettman et al. ............... 715/848 |
| 2005/0132299 A1* | 6/2005 | Jones et al. ................... 715/759 |
| 2005/0185102 A1 | 8/2005 | Fairhurst |
| 2007/0294632 A1* | 12/2007 | Toyama et al. ............... 715/764 |

(Continued)

FOREIGN PATENT DOCUMENTS

DE    101 38 337 A1    11/2002

OTHER PUBLICATIONS

"WebEx Meeting Center User's Guide," 2007, 365 pages.*

(Continued)

*Primary Examiner* — Kieu Vu
*Assistant Examiner* — Asteway T Gattew
(74) *Attorney, Agent, or Firm* — Louis Wu

(57) ABSTRACT

Described herein are systems and methods for enabling an unlimited multi-user desktop environment. In accordance with an embodiment the system includes a computing device hosting the desktop. Each user connects to the desktop through the same or different computing devices. Each user will in their client-area render a section of the unlimited multi-user desktop. The section can be the same or different for all users. An embodiment will allow compatible objects to render the same content at different content positions for each connected user. For example a user can scroll on a shared webpage without impacting the scroll position for other users looking at the same window of the same webpage. Additional embodiments are also described herein.

17 Claims, 8 Drawing Sheets

(56) References Cited

U.S. PATENT DOCUMENTS

| | | |
|---|---|---|
| 2009/0096810 A1 | 4/2009 | Green |
| 2011/0202834 A1* | 8/2011 | Mandryk et al. .............. 715/701 |
| 2012/0054640 A1 | 3/2012 | Nancke-Krogh |
| 2013/0080940 A1* | 3/2013 | Reeves ................. G06F 1/1616 715/761 |
| 2013/0091205 A1* | 4/2013 | Kotler ................. H04L 65/4015 709/204 |
| 2014/0333674 A1* | 11/2014 | Lawson ................ G06F 3/0481 345/684 |

OTHER PUBLICATIONS

International Searching Authority, International Search Report and Written Opinion for PCT/US2013/038916, Oct. 29, 2013, 15 pages.
Communication pursuant to Article 94(3) EPC for a related foreign equivalent patent application.

* cited by examiner

SYSTEM AND METHOD FOR UNLIMITED MULTI-USER COMPUTER DESKTOP ENVIRONMENT

CLAIM OF PRIORITY

This application claims the benefit of priority to U.S. Provisional Patent Application titled "SYSTEM AND METHOD FOR UNLIMITED MULTI-USER COMPUTER DESKTOP ENVIRONMENT", Application No. 61/640,550, filed Apr. 30, 2012; and U.S. Provisional Patent Application titled "SYSTEM AND METHOD FOR UNLIMITED MULTI-USER COMPUTER DESKTOP ENVIRONMENT", Application No. 61/790,895, filed Mar. 15, 2013; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems, and user-computer interaction, and are particularly related to systems and methods for enabling an unlimited multi-user computer desktop.

BACKGROUND

A traditional computer is equipped with a desktop confined to the size of the monitors attached to the computer. The computer desktop is traditionally organized in layers of objects—typically referred to as windows, applications or widgets. The lowest layer of the desktop contains a background image and on top of that icons or shortcuts used to start applications that will render themselves as layered windows.

The layering of objects is a natural way to extend the use of the computer to do more than one thing at a time and to quickly jump between tasks. However it only works well when the number of objects is fairly small. Once a larger number of objects are running then the task of finding the object becomes quite complicated as the user has to shuffle through the stack of objects. Many other inventions has tried to simplify the search for the object of interest by providing for example a preview of the object when the user hover the mouse over the object icon or when the number of active objects are presented in preview thumbs on a task-list. The growing number of tasks solved with computers call for an ever growing number of objects and thus a better way to arrange objects on a desktop is needed.

SUMMARY

Described herein are systems and methods for enabling an unlimited multi-user desktop environment. In accordance with an embodiment the system includes a computing device hosting the desktop. Each user connects to the desktop through the same or different computing devices. Each user will in their client-area render a section of the unlimited multi-user desktop. The section can be the same or different for all users. An embodiment will allow compatible objects to render the same content at different content positions for each connected user. For example a user can scroll on a shared webpage without impacting the scroll position for other users looking at the same window of the same webpage. Additional embodiments are also described herein.

DETAILED DESCRIPTION

Figure 1:
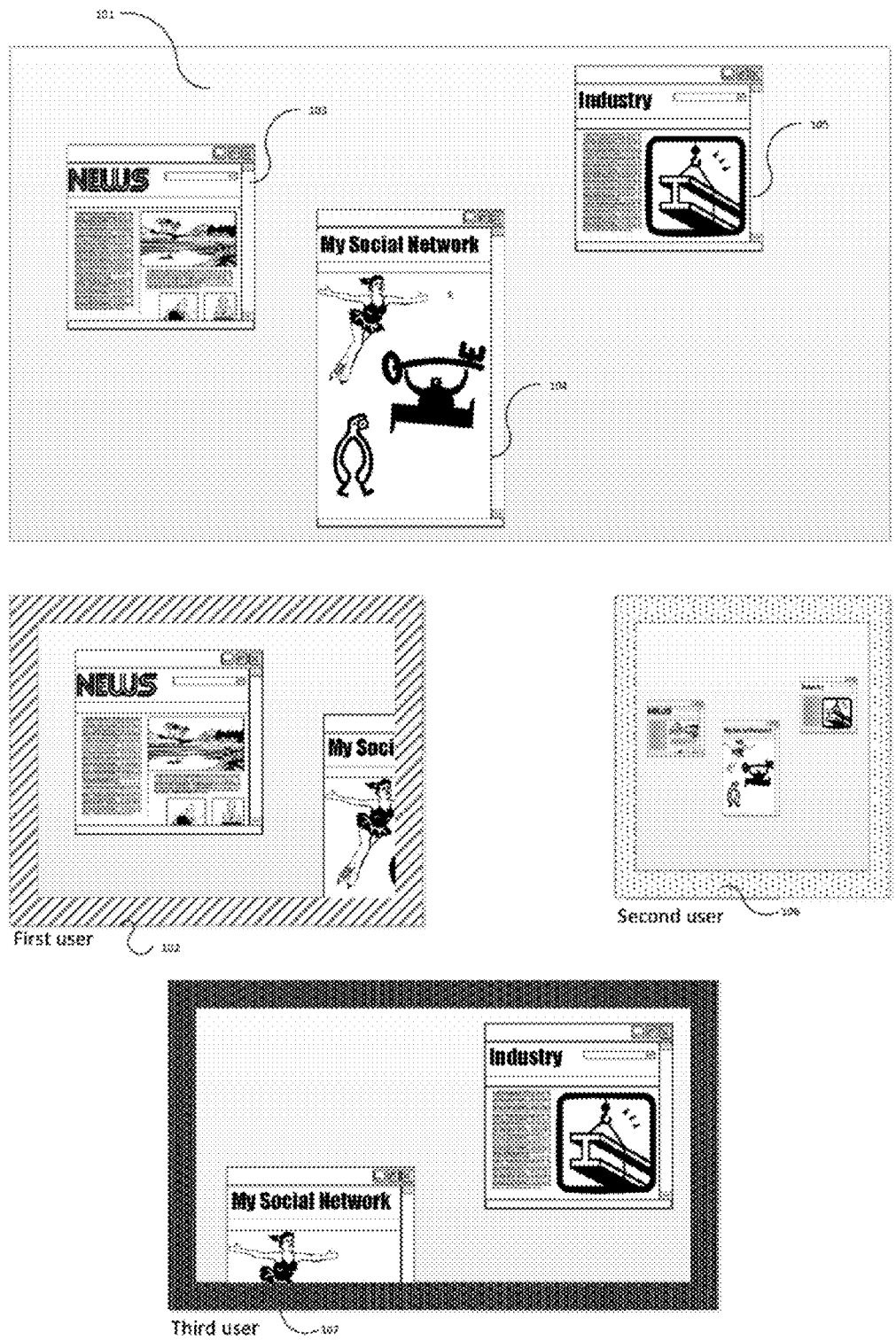
FIG. 1 shows an example of an embodiment of the unlimited multi user desktop with three users connected. The example show how each user can independently choose which section of the desktop to look at, and at individual zoom levels and through individual dimension of the users device or section of device allocated for the unlimited multi-user desktop.

The invention of an unlimited multi-user desktop where all objects are visible and the user can freely navigate the entire desktop helps solve this problem. The solution is based on the physical world where users sit around an enormous table with papers all over it. A first user can choose to sit anywhere along the sides of the table and read/write on any of the papers within reach of that chair. Simultaneously a second user can sit on any other chair around the table and work with other papers. Applying the same concept on the computer desktop gives several additional advantages that the physical work does not allow. (1) Several users can be sitting on the same "chair" at the same time, reading or writing the same object. (2) When a larger surface is needed to hold new/more objects, then a computer based system will simply extend the available size as needed.

As the monitors on our computers are getting larger, it is now feasible to have several people collaborating or working independently from the same monitor, powered by the same computing device. This however is not yet possible with our current operating systems such as Microsoft Windows, Apple's OSX, Android and Linux since all of these operating systems are designed for single person use. That means only one object can be active at a time. This means adding touch capability to the operating system or adding additional mouse and keyboard is not enough to allow multiple users to use the same computing device simultaneously. The invention of the unlimited multi-user desktop solves this. With the unlimited desktop all the objects are distributed over an unlimited surface. Instead of icons that can launch the object, the actual object(s) is on the desktop. Due to the unlimited size the user can scroll to the section of the desktop they want to see—particularly the section containing the object they want to use. Since roaming is personal, another user can via their client-area (on the same computing device or on another computing device) choose to navigate to a different section of the unlimited multi-user desktop and use the objects located there. With an unlimited multi-user desktop, the users are no longer bound by the same computer, as a system designed for free roaming on the entre desktop can be navigated from any other computer device running compatible software.

GLOSSARY OF TERMS

In accordance with an embodiment, the following terms are used herein:

A "controlling user of an object" refers to the specific user that currently has the right to move/resize/layer and change state of the specific object. Each object can only have one controlling user at any given point in time. An object may not have any controlling user, meaning that any user who wants to take control can get it.

"Active users of an object" refers to the unique list of multiple users that is actively using the specific object. Each object can have none or one or multiple users actively using the object simultaneously.

A desktop refers to the placement, size and layer of a collection of objects over a defined area. The information is stored within the computing device defined as the host of the desktop.

A multi-user desktop refer to a desktop that allow the ability of a plurality of users to view the same or unique locations and/or unique zoom of the area defined as the desktop. The objects position, size and z-layer are shared between all users. The content position within an object can be unique for each user if supported by the object.

An unlimited desktop refer to a desktop where the position of objects and the area they occupy has no limits. This means for example that the distance between two objects can be approaching indefinite. The physical display or collection of displays through which a user is viewing the desktop has physical limits in size. This means that the user can choose which section of the desktop to have in view and at what zoom ratio.

A controlled movement refers to the movement of an object made under direct control of user input. An example is when a user is moving an object with a mouse or with touch.

An animated movement refers to the movement of an object made by a physics engine. This movement is the result of previously controlled movement by a user followed by the user letting go of the control.

A "Client-area" refers to the size and proportion of the monitor or division of a monitor that a user (client) uses to render a section of the desktop.

An object refers to a graphical element rendered by a computing device. The element occupies a certain area than can be but is not restricted to a rectangular shape. The object has a position. An object can contain state and methods for how rendered output and state is a function of input over time. An object can have state changes that are local in nature and state changes that impact the entire object. For example if the object is a browser the state describing the content position of the page is local in nature where the state describing the loaded URL impacts the entire object. An object can be but is not limited to a window, widget or application e.g. for handling documents, spreadsheets, presentations, web-browser and PDF.

Described herein are systems and methods for enabling an unlimited multi-user desktop graphical user interface for computing devices. In accordance with an embodiment, the systems include a computing device that are running the objects with state and functionality, for example applications and store and maintain the objects position and size and z-layer on the unlimited desktop. The z-layer denotes the objects layered order in the stack of objects. This is used to determine what object is on top and what sections of the objects below are visible to render. Additional computing devices can be part of an embodiment in the event there are users connecting to the desktop from other computing devices. The computing device hosting the desktop must keep track of each connected user at any one time. Each user will be having a set of properties attached to them such as (1) the area of the desktop they are currently looking at in terms of top-left position, size and zoom level, (2) the objects that are rendered on the section of the desktop the user can see.

Each object in an embodiment will have a list of properties attached: (1) which user, if any, is controlling the object's position/size/layer. This is referred to as the "controlling user of an object". There can be only one controlling user for each object. (2) The list of users who is actively using the object. This is referred to as "active users of an object". An embodiment will use a variation of techniques to determine if a user is actively using a given object. One technique is to mark the user as active on an object once the user has interacted with the object and then remove the activation after a given time. Another technique is to mark the user as active for any given object that is in view of the user and to remove the active status once the window is no longer in view.

The computing device hosting the desktop will use the following information to determine the section of the desktop that is in view to each user: (1) The size of the users monitor(s) or section of monitor(s) used to render a section of the desktop, (2) the position on the desktop, (3) the zoom level. The computing device with the desktop will limit communication of activity and updates of objects to users that has the impacted section of the desktop in view.

An embodiment could implement a notification system for active users of an object. The purpose of such a system is to inform all or selected users of which objects are actively used by which users. That information is useful in the event a plurality of users want to engage in a shared activity around the same object. One example of an embodiment could be but not limited to that each user is assigned a user specific and unique color. This color can be rendered along the border of the users' application rendering the section of the desktop in view. That way each user knows what their assigned color is. An area of each object can be used to render the color of the active users. If several users are actively using the object at the same time then all the users colors will be rendered in this area of the object. One example of this rendering is to use the border of the object to render the color or stripes of colors in case multiple users are active. Another example is a list of the active users' names is placed in a predefined section of the object.

An embodiment could implement a notification system for the controlling user of an object. The purpose of such a system is to handle the conflict when a second user want to take control of an object that is currently in control by a first user or is actively used by one or multiple other users. Once a second user is granted the right to control an object, the movement/resize/layering made by the second user is reflected on all connected users with this object in view. An embodiment will chose between different levels of restrictions to balance between the conveniences of being able to move freely with the intrusion of interrupting other users. In this case the impacted users of a second user taking control will be a first user that currently has control and/or any other users actively using the object. An embodiment can choose to implement restrictions at various levels. The lowest possible restriction would be to simply grant access to the second user right away. A higher restriction level could be to inform the second user that other users are in control and then ask the second user to confirm or cancel the control before the system grants the control. An even higher restricted level could be to prevent a second user from getting control until all active users and/or any controlling user (if such exist) accept to release the control based on a notification that the second user want to gain control. The level of restriction could preferably be configurable by the desktop owner.

Some objects will only be able to render the same content in all users' views of the same object. Other objects, like for example a web browser or a PDF file or a document or presentation or spreadsheet could offer the users the ability to scroll different sections of the object independently of each other. This would have the added benefit of e.g. allowing two or more users to simultaneously read from the same source but allow one of the users to scroll down faster than the other user.

Some interactions with an object will result in state change that affects all active users of the object. One example is when multiple users are active on the same instance of a website, and a second user is clicking a link that navigates to a different page. This navigation will impact all active users of that instance of the website. To avoid disrupting the other users in their ongoing activity with the object, a notification system will be beneficial. Such a notification system could operate on several configurable levels of restriction. The lowest restrictive level could be when a user initiated object state change is executed right away. A more restrictive approach could be when the second user requesting the change is notified that this will impact other users who are currently active (a notification will only happen if other users is actively using the window). The most restrictive system could be when the other active users will be prompted and requested to allow the state change before the second user is able to complete the requested change.

In addition to the previously described notification system another component can be added to an embodiment. The addition can allow the second user requesting to initiate a state change on an object that is actively used by other users, to create a new object instance starting from substantially the same state and then execute the requested state change onto that new object. This method will allow the second user to perform any change on an object without interrupting other users. These two methods ([0032] & [0033]) can be combined where a second users request to change an object state actively used by a first user could result in a notification to the second user asking if the second user would like to perform the state change in the same object and thereby impact all active users or if the user would like to perform the state change into a new object. This method of handling interaction with an object by multiple users is very relevant for but not limited to e.g. web applications, as it allow a simultaneous consumption of a website on different sections of the shared web page and in addition allow both users to navigate to the same new content page or any one of the users to branch off and create a new shared instance of the application. The newly created object will be created on the unlimited multi-user desktop and therefore accessible and visible to all connected users.

An embodiment can choose to implement a physics engine which simulates friction so that when a user releases control of movement, then the movement will continue in the direction and speed of the controlled movement and with a deceleration equivalent to the chosen friction. With such a physics system, border control is important to implement as without it, the user can inadvertently put an object in motion in a way that make it increase the size of the desktop far further than what the user intended. One suitable solution to this problem could be to restrict movement of an object to stay within the boundaries of the currently visible area of the desktop at the current zoom level. This will prevent objects from getting lost due to a fast movement made by the user. In order to make the system even more useful, the borders will be set to a certain distance inside the viewable area. That way an object pushed to the side will not end up along the edge of the viewable area but rather at the predefined distance from the edge of the viewable area and with that allow the user to move the object without repositioning the desktop.

An embodiment with a physics engine will benefit from implementing a stretched movement when an object is moved outside the border either controlled by a user or animated by the physics engine. The stretched movement will give the user the experience of a rubber-band surrounding the border. This means that a controlled movement outside the border will only partially follow the users input with less impact on the rendered position the further into the border zone that the overshoot is. Similarly if the object is violating the border due to a simulated movement by the physics engine, then the distance rendered by the object is reduced the further into the border zone that the movement takes the object. Once the movement has ended, that is, if the user release control and speed animation has ended or when a previously released control has ended its speed animation into the border zone, then the object will be animated back into the position where the border is no longer violated. This border animation should be made so that it looks like the window is pulled gently back to where the border no longer is violated.

A suitable formula for the move-animation, (i.e. the animation of the position following a user releasing direct control of the window) could be a standard formula for an initial speed & fixed friction system. For example: A=deceleration [m/s2], V=initial speed [m/s], T=duration of animation, calculated as V/A. D=distance covered while bringing the object to a halt given the initial speed and the fixed friction, calculated as V*T/2. During the animation the time 't' is going from zero to T. During this time the relative position to the last recorded position while in user control is calculated as D*(t/T+(T*t−t*t)/(T*T)).

A suitable formula for the rendered position relative to the border position as function of the requested border violation delta will need to return a lower number than what was requested. The simplest possible formula could be to take the distance requested and multiply that with a fixed factor less than 1. The benefit of this formula is that there is no limit to how far the user can stretch into the border zone; the downside is that the rendered output drops significantly as soon as the border zone is violated and thereby not giving the best possible simulation of a rubber-band covered border. A more realistic formula could be to follow an exponential curve with definitions of how much the rubber-band must be able to stretch and how far the requested border violation will be when the maximum stretch is reached. Once maximum stretch is reached the rendered output will stop at that level. Due to the use of exponential functions this formula, while being more demanding to calculate, offers a realistic representation of the physical world. The parameters involved are: A=max rendered output position relative to the border position, this is an input. B=requested border violation position, relative to the border position, this is an input. With D being the current requested border violation position relative to the border limit, then the rendered output position relative to the border position is calculated as: MIN(B,D)*A/B*EXP(1−ABS(MIN(B,D))/B).

A suitable formula for animating an object that is violating the border back into a non-violated position could be to let the object follow an exponential function. The parameters are: D=requested border violation distance relative to border position, this is input. T=total duration of animation, this is input. C=speed factor, must be less than 1 and positive, this is input. With 't' being the current time, starting from 0, going to T, then the rendered border violation relative to the border position follows the formula D*exp(−t/(C*T)).

FIG. 1 shows an example of an embodiment of the unlimited multi-user desktop with three users connected. The entire desktop (101) has three windows (103, 104 and 105). In this example the first user (102) is showing the desktop at 100% zoom. The size of the client-area allows the first user to see all of one window (103) and a part of another window (104). A second user (106) has another proportion of the client-area. The second user has chosen to zoom the desktop so that all windows (103, 104 and 105) are visible within the client-area. A third user (107) has a third proportion of the client-area. The desktop position chosen by the third user allow some of one window (104) and all of another window (105) to be visible to the third user. Notice how each of the three users in this example will get a user specific color rendered along the border of their client-area. This color is used to identify each user and will in the other figures be used to illustrate who is actively using a window. The color is only one example of identifying more than one user—other methods could include numbers, patterns and/or text.

Figure 2:
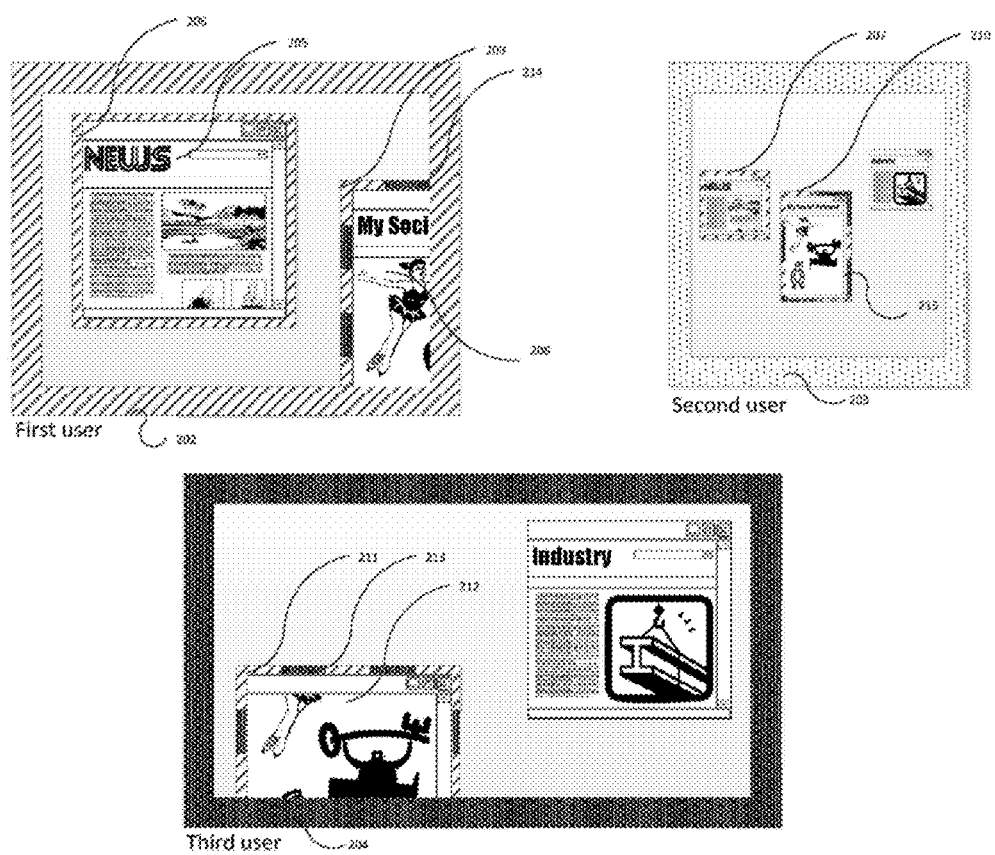
FIG. 2 shows an example of how an objects active state could be rendered on all users views of the desktop. It also shows how multiple users actively using the same object can be rendered as a striped border containing each users color. Finally the illustration show how some objects allow each user to have an individual content position of the same shared object.

FIG. 2 is a continuation of the desktop introduced in FIG. 1. In this illustration the first user (202) starts with activating a window (205) e.g. by touching the window or scrolling the content in the window. As soon as the window is activated by the first user, the border of the window (206) will be rendered in the first users color. All other connected users that has this window in their client-area will see the first users color for the border of the window (207). Another example is that the first user (202) activates a window (208). As a result the border is colored with the first users color on all visible views of the window (209), (210) and (211). Next step is that the third user (204) scrolls the content in a window (212) upwards into a new position. In this example the window (212) will allow user specific content positions. As a result the window (212) will be activated for this third user. This is illustrated to all users by a two-colored border (213) of both the first and third user. This happens on all instances of the window (214) and (215). Notice how the content position of window (208) remains unchanged because the first user has not changed the content position.

Figure 3:
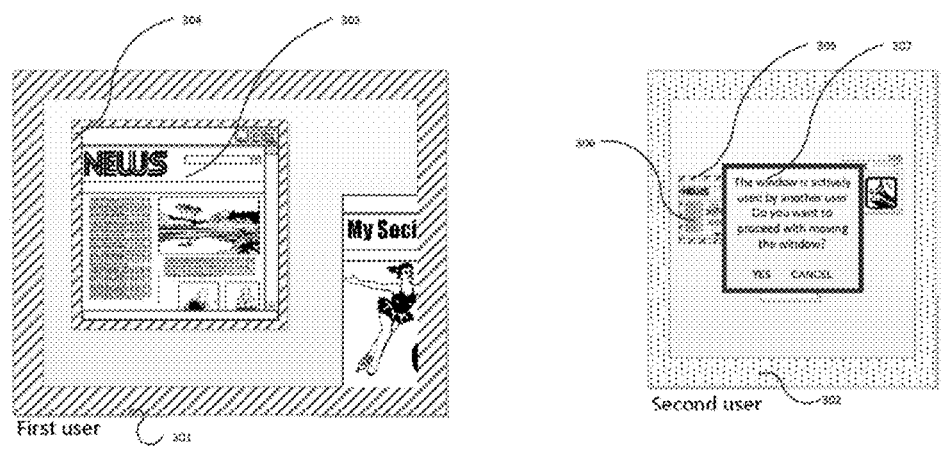
FIG. 3 shows an example of how notification of a user taking control of an active object can be implemented.

FIG. 3 is a continuation of the desktop introduced in FIG. 1. In this illustration a first user (301) activates the window (303). In response, the multi-user desktop client will render the first users color on the border (304) and (305). Next step is that the second user (302) tries to move the window (306). In this example the window is actively used by the first user and the second user will get a prompt (307) informing the second user about this fact and asking what action to take. If the second user selects "YES" then control is granted to the second user and the second user is now allowed to freely move the window. This will impact the first user as well since the window is shared. If the second user clicks "CANCEL" then the request is cancelled. If the request is cancelled the window is not activated for the second user and the first user keep control of the window because no change is made by the second user.

Figure 4:
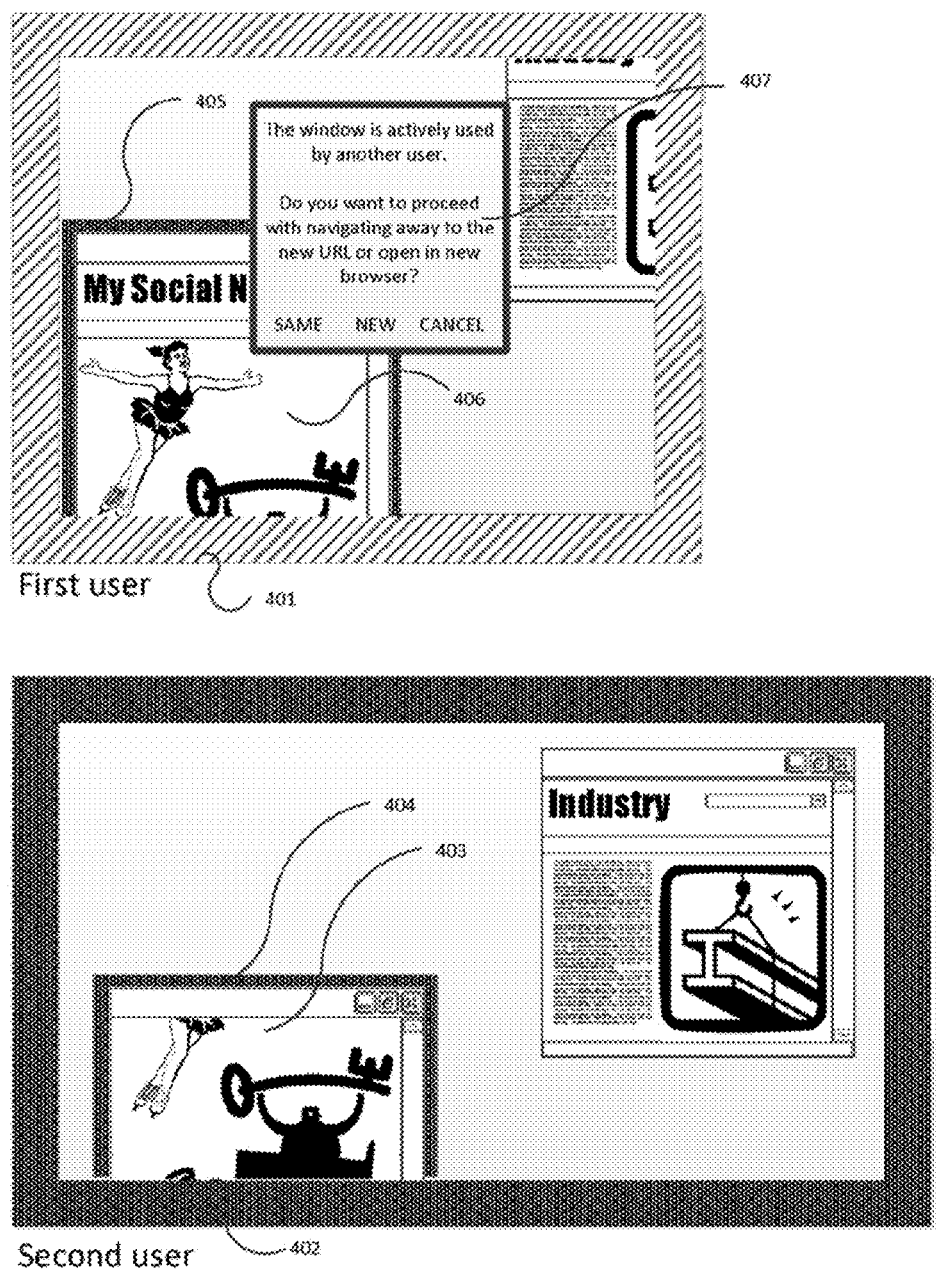
FIG. 4 shows an example of how notification of a first user requesting to change an objects state through an object that is already actively used by a second user can be implemented.

FIG. 4 is a continuation of the desktop introduced in FIG. 1. In this illustration a second user (402) has scrolled the content in the window (403). This means the window is activated and as a result the border (404) and (405) is given the second users color. Next step is that the first user (401) tries to change the application state behind the window (406). In this example it is a webpage where the first user clicks the image (406) which contains a URL to a different website—i.e. if this URL is loaded the object state will change. Since the window is actively used by the second user it means that a change made by the first user on this window will impact the second user. Because of this, an embodiment will in this example show a dialog box (407), informing the first user about the potential impact of the requested action. The three options are discussed in the following FIGS. 5, 6 and 7.

Figure 5:
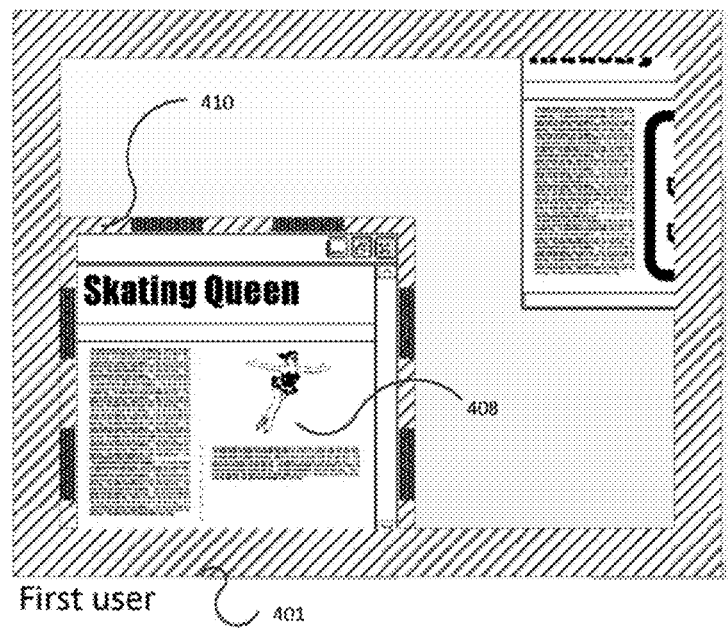
FIG. 5 is a continuation of FIG. 4. In this illustration the first user selected "SAME" (One of 3 options in the FIG. 4 example) and thereby the requested object state change is imposed on the shared object and the result is reflected in both users' views of the object.
Figure 5:
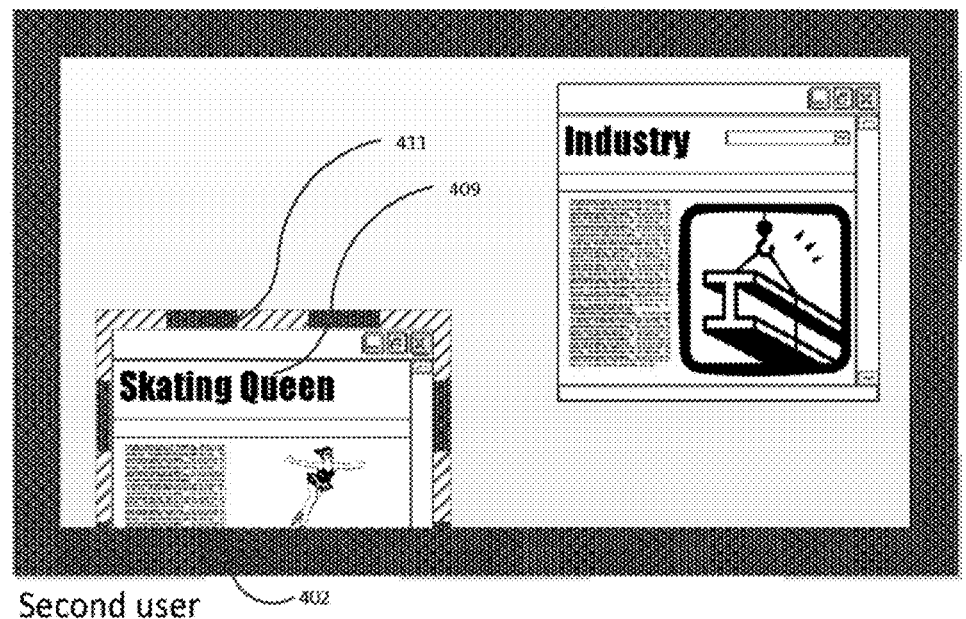

FIG. 5 is a continuation of the example described in FIG. 4. In this illustration the first user selects the option "SAME". As a result the URL behind the link is activated and loaded into the application. The result is rendered in the window for all users (408) and (409). Now when the first user has activated the window, both the second and first users' colors are used in the border (410) and (411).

Figure 6:
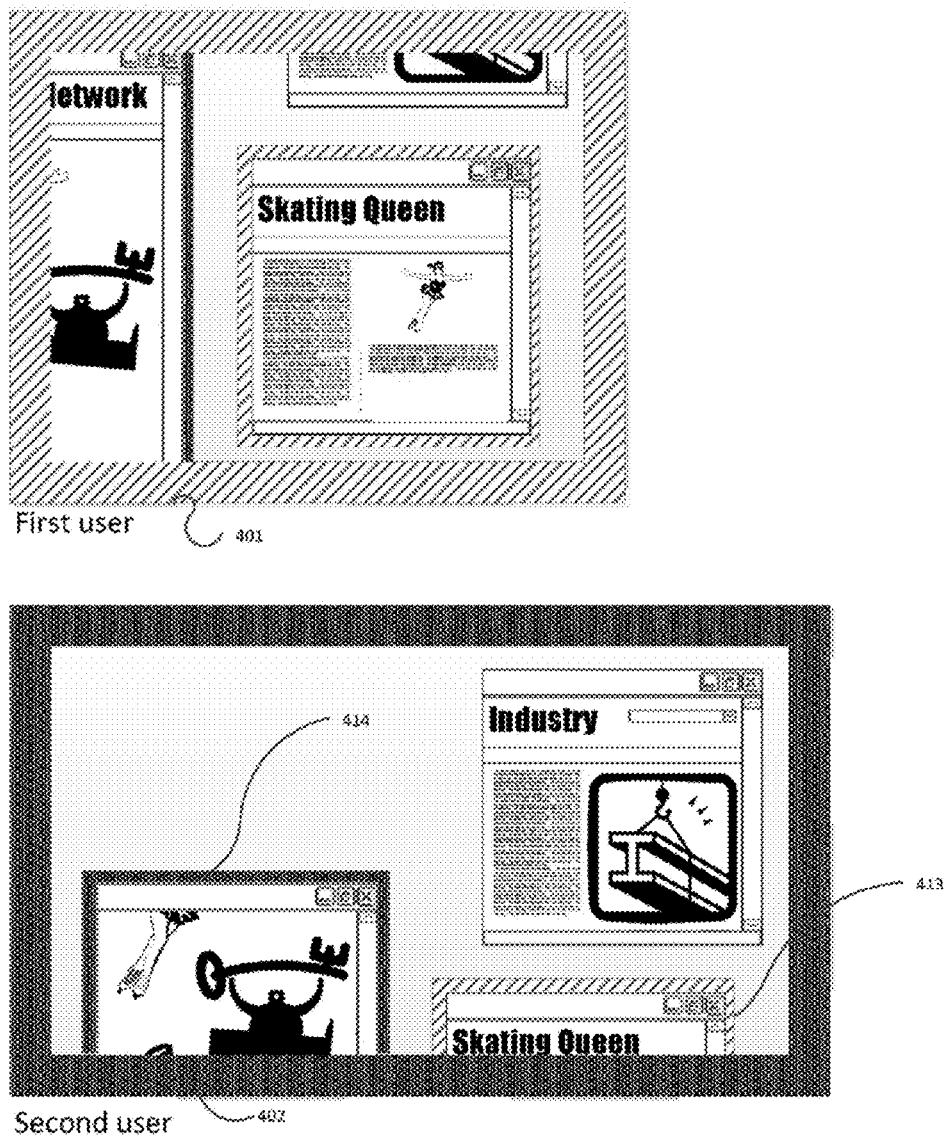
FIG. 6 is a continuation of FIG. 4. In this illustration the first user selected "NEW" (One of 3 options in the FIG. 4 example) and thereby the requested object state change is imposed on a newly created object through the original object. This will leave the original object unchanged and the new object moved into view on the first users' client-area.

FIG. 6 is a continuation of the example described in FIG. 4. In this illustration the first user selects the option "NEW". As a result a new application instance is created with a copy of the state from the original application and the corresponding window for this application is opened on the unlimited multi-user desktop at a free position. The desktop position for the first user is changed so that the new window is fully visible. The requested action (in this case loading of a URL behind a link) is executed on the new window and the result is rendered for all users that can see the window (412) and (413). The border of the window is given the first users color since this user is considered an active user of this window.

The original window (414) is left as it was with no change of content and no change of active users.

Figure 7:
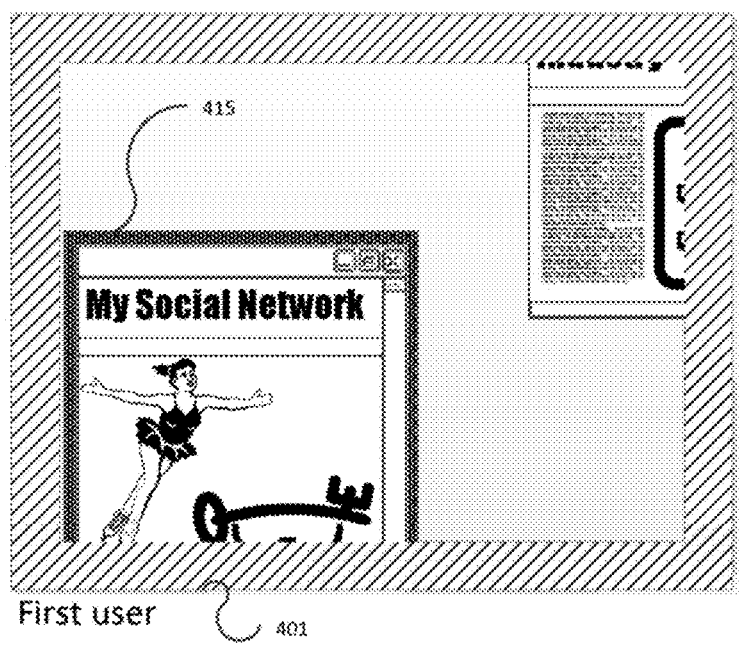
FIG. 7 is a continuation of FIG. 4. In this illustration the first user selected "CANCEL" (One of 3 options in the FIG. 4 example) and thereby the requested object state change is not imposed, leaving the original object remaining active for the second user only.
Figure 7:
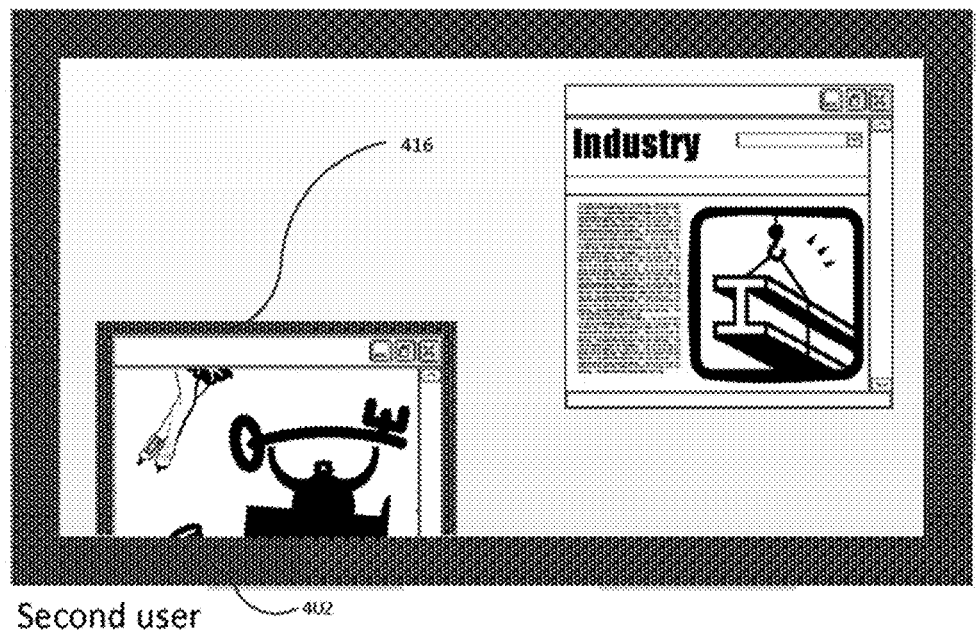

FIG. 7 is a continuation of the example described in FIG. 4. In this illustration the first user selects the option "CANCEL". As a result the request is cancelled and the active state of the window remains unchanged, i.e. the border (415) and (416) remain unchanged as well.

Figure 8:
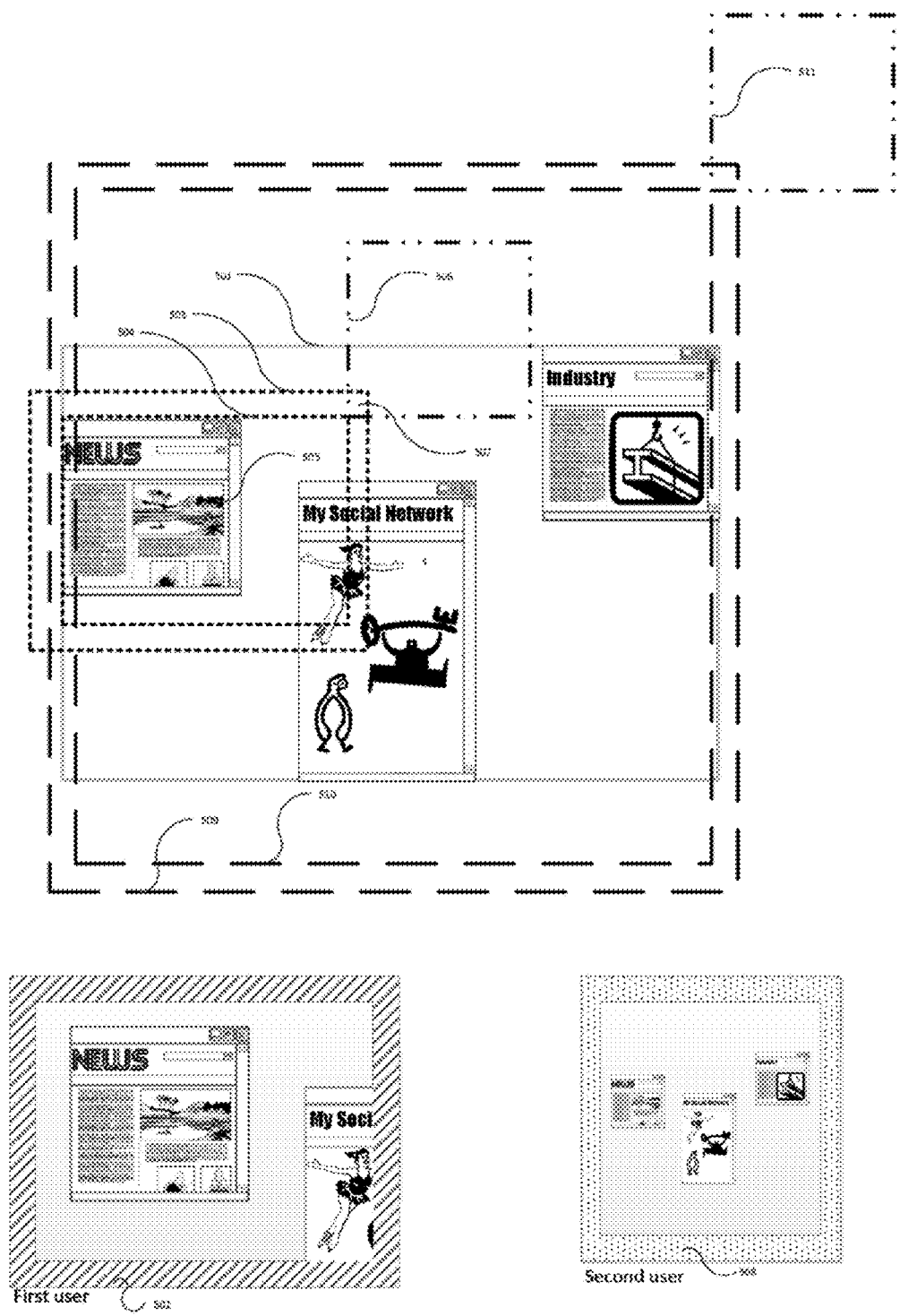
FIG. 8 is an example of how the desktop can be expanded into an unlimited size and where this expansion is user specific, limited to the section of the client-area of the user making the expansion.

FIG. 8 is an example of how the unlimited multi-user desktop can be expanded indefinitely and how the border limit for moving windows is based on the users' client-area. The entire desktop (501—marked as solid line) is in this example used by two users. A first user (502) has the section (503—marked as dotted line) as client-area with the boarder limit (504). If the first user moves window (505) to the upper-right most position, then the window will end up covering the area (506—marked as "long dash dot dot" line) on the desktop. The only section of the window (505) visible to the first user after this move is the lower left corner of the window which is now located at the upper-right corner of the client-area (507). Similarly, the second user (508) has the section (509—marked as "long dash" line) and border limit (510) on the desktop. If the second user moves the same window (505) to the second user's upper-right most position, then the window (505) will end up covering area (511—marked as "long dash dot dot" line).

Described herein are systems and methods for enabling an unlimited multi-user desktop environment. In accordance with an embodiment the system includes a computing device hosting the desktop. Each user connects to the desktop through the same or different computing devices. Each user will in their client-area render a section of the unlimited multi-user desktop. The section can be the same or different for all users. An embodiment will allow compatible objects to render the same content at different content positions for each connected user. For example a user can scroll on a shared webpage without impacting the scroll position for other users looking at the same window of the same webpage. An embodiment will have a notification and permission system in place designed to handle conflicts when multiple users for example tries to change the state of an object. Similarly an embodiment will take active users into account in the notification and conflict management system so that suitable notifications and handling is done if a first user for example attempts to move an object that is actively used by another user—since the desktop is shared a movement of the object made by one user applies to all users. An embodiment will typically include some sort of visual feedback to guide the users of what objects are actively used by other users. The purpose is to prevent changes to objects made by one user while the object is used by one or more other users. An embodiment will also allow compatible objects to start new object instances from the same state as an existing object in the event a user want to perform a state changing action on an object that is actively used by other users. This method prevents disruption of the other users of the unlimited multi-user desktop. An embodiment will allow any user to place any object at any location on an unlimited sized desktop. Typically an embodiment will include border control of the movement to prevent a user from accidentally moving the object so far away that the object becomes difficult to locate again.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system that delivers a multi-user computer desktop environment, comprising:
    a computer system that may be used simultaneously by a plurality of users, including one or more processors, and including at least a host computer hosting a desktop, where a position of an object such as a window and the area the object occupies has no limits; and
    at least one display having a computer desktop area through which a user is viewing the desktop or a section of the desktop; and
    a rendering logic that enables the computer system to render multiple simultaneous views of the desktop or section of the desktop, the views being overlapping or not overlapping, each view capable of being controlled independently by each user,
    wherein the views can be rendered on a visual device coupled to the host computer, or can be rendered on an arbitrary number of other visual devices being coupled over a computer network,
    further wherein information is delivered to the rendering logic, the information describing which objects are visible for a requesting view area defined by the requesting view, and
    further wherein the computer system has an individual desktop view zooming capability as well as an object moving capability that may result in desktop expansion.

2. The system of claim 1, wherein a window is created on a first computer and moved to a second computer of the computer system through a shared desktop, wherein such move is performed by a user moving the window over a distance on a display, or by a user changing which section of the desktop is in view, and in that manner rendering windows on a local computer that originates on another computer.

3. The system of claim 1, wherein when moving a window with touch or mouse gestures, a physics animation can be used to simulate continuous movement with friction after the user's move input has ended, or wherein a boundary on the desktop is defined by a perimeter of the user's view and is used to prevent the movement moving the window outside of the user's view, unless the window is being moved in one or more particular directions that have special actions tied to the one or more particular directions.

4. The system of claim 3, wherein when the window is forced outside a boundary with a controlled move or animated move, then a stretched rendering allows a minor movement outside to be rendered and then animated back to stay within the boundary.

5. The system of claim 1, having a desktop view that is capable of being independent of all visual displays sizes for all users of the system.

6. The system of claim 1, having a capability to address conflicts that may occur when multiple simultaneous user interactions occur for the same object.

7. A system that delivers a multi-user computer desktop environment, comprising:
   a computer system that may be used by a plurality of users simultaneously, including one or more processors; and
   a shared desktop with multiple simultaneous views, where a position of an object and the area of the object has no limits, each view capable of being controlled independently by each user, and
   at least one display having a computer desktop area through which a user is viewing the shared desktop or a section of the shared desktop;
   wherein the shared desktop can be spanning more than one computer,
   further wherein a per-window basis user collision control logic enables a view rendering a window to take control of the window's position, size and z-layer, while allowing other views rendering the same window to be notified of a new user taking control of the position/size/z-layer, and, if chosen presents information messages to either a previous user in control, or all users viewing, or delays granting the control to the new user until an existing user has released their control, and
   further wherein the computer system has an individual desktop view zooming capability as well as an object moving capability that may result in desktop expansion.

8. A system that delivers a multi-user computer desktop environment, comprising:
   a computer system that may be used by a plurality of users simultaneously, including one or more processors; and
   a shared desktop with multiple simultaneous views, where a position of an object and the area the object occupies has no limits, each view capable of being controlled independently by each user, and
   at least one display having a computer desktop area through which a user is viewing the shared desktop or a section of the shared desktop;
   wherein the shared desktop can be spanning more than one computer
   further wherein the system performs per-window basis tracking of which views are currently rendering any section of a window, allowing other views to know who else is watching the same window, and with that enable a computer of the computer system running an application to know which other computer or computers are in need of rendering data to be delivered by a host computer, and,
   further wherein the computer system has an individual desktop view zooming capability as well as an object moving capability that may result in desktop expansion.

9. A system that delivers a multi-user computer desktop environment, comprising:
   a computer system that may be used by a plurality of users simultaneously, including one or more processors; and
   a shared desktop with multiple simultaneous views such that each view is capable of being controlled independently by each user, where a position of an object and the area the object occupies has no limits; and
   at least one display having a computer desktop area through which a user is viewing the shared desktop or a section of the shared desktop,
   wherein the shared desktop can be spanning more than one computer,
   further wherein the computer system performs per-window basis tracking of which views are currently actively using a window, allowing other views to know who else is actively using the same window, which information is used as input to a collision control logic, where input made into a window from one view triggers a state change in a current application and thereby a rendering change, impacting other watching and active views, and enables a view of the state change to be requested if a new application instance should be created, or if the state change should be made in the current application, and with that impact other active or watching users, and
   further wherein the computer system has an individual desktop view zooming capability as well as an object moving capability that may result in desktop expansion.

10. A method of enabling a multi-user computer desktop environment, comprising:
    providing a desktop, where a position of an object and the area the object occupies has no limits; and
    at least one display having a computer desktop area through which a user is viewing the desktop or a section of the desktop; and
    providing a rendering logic that enables multiple simultaneous views of a desktop section, which may be overlapping or not overlapping, wherein the views can be rendered on the same computer hosting the desktop, or on an arbitrary number of other computers connected over a computer network, each view capable of being controlled independently by each of a plurality of users, and
    wherein information is delivered to the rendering logic describing which window or windows are visible for an area defined by a requesting view, thereby allowing a plurality of users to collaborate simultaneously, and
    further wherein the computer system has an individual desktop view zooming capability as well as an object moving capability that may result in desktop expansion.

11. The method of claim 10, wherein a window can be created on a first computer and moved to a second computer through a shared desktop, wherein such move can be performed by a user moving the window over a distance on a display device, or by a user changing which section of the desktop is in view, and in that manner rendering windows on a local computer that originates on another computer.

12. The method of claim 10, wherein when moving a window with touch or mouse gestures, a physics animation can be used to simulate continuous movement with friction after the user's move input has ended, or wherein a boundary on the desktop is defined by a perimeter of the view and is used to prevent the movement moving the window outside of the user's view, unless the window is being moved in one or more particular directions that have special actions tied to the one or more particular directions.

13. The method of claim 12, wherein when a window is forced outside a boundary with a controlled move or animated move, then a stretched rendering allows a movement outside the boundary to be rendered and then animated back to stay within the boundary.

14. A method of enabling a multi-user computer desktop environment, comprising:
   providing a desktop, where a position of an object and the area the object occupies has no limits, and
   at least one display having a computer desktop area through which a user is viewing the desktop or a section of the desktop;
   wherein the desktop can be spanning more than one computer,
   further wherein a per-window basis user collision control logic enables a user-associated view rendering a window to take control of the window's position, size and z-layer, while allowing other views rendering the same window to be notified of a new user taking control of the position/size/z-layer, and, if chosen presents information messages to either a previous user in control, or all users viewing, or delays granting the control to the new user until an existing user has released control, thereby allowing use by a plurality of users simultaneously and allowing independent control by each user with respect to the users' own views, and
   further wherein the computer system has an individual desktop view zooming capability as well as an object moving capability that may result in desktop expansion.

15. A method of enabling a multi-user desktop environment, comprising:
   providing a desktop, where a position of an object and the area the object occupies has no limits; and
   at least one display having a computer desktop area through which a user is viewing the desktop or a section of the desktop,
   wherein the desktop can be spanning more than one computer,
   further wherein the system performs per-window basis tracking of which views are currently rendering any section of a window, allowing other views to know who else is watching the same window, and with that enable a computer running an application to know which other computers are in need of rendering data to be delivered by a host computer, thereby allowing use by a plurality of users simultaneously and allowing independent control by each user with respect to the users' own views, and,
   further wherein the computer system has an individual desktop view zooming capability as well as an object moving capability that may result in desktop expansion.

16. A method of enabling a multi-user desktop environment, comprising:
   providing a desktop, where a position of an object and the area the object occupies has no limits; and
   providing at least one display having a desktop area through which a user is viewing the desktop or a section of the desktop;
   wherein the desktop can be spanning more than one computer,
   further wherein the system performs per-window basis tracking of which views are currently actively using a window, allowing other views to know who else is actively using the same window, which information is used as input to a collision control logic, where input made into a window from one view triggers a state change in the application and thereby a rendering change, impacting other watching and active views, and enables the state changing view to be requested if a new application instance should be created, or if the state change should be made in the current application, and with that impact other active or watching users, thereby allowing use by a plurality of users simultaneously and allowing independent control by each user with respect to the users' own views, and,
   further wherein the computer system has an individual desktop view zooming capability as well as an object moving capability that may result in desktop expansion.

17. A non-transitory computer readable medium, including instructions stored thereon which when read and executed by one or more computers cause the one or more computers to perform the acts comprising:
   providing a desktop, where a position of an object and the area the object occupies has no limits; and
   providing at least one display having a computer desktop area through which a user is viewing the desktop or a section of the desktop; and
   providing a rendering logic that enables multiple simultaneous views of the desktop or a section of the desktop, which may be overlapping or not overlapping, wherein the views can be rendered on the same computer hosting the desktop, or on an arbitrary number of other computers connected over a computer network, thereby allowing use by a plurality of users simultaneously and allowing independent control by each user with respect to the users' own views; and
   wherein information is delivered to the rendering logic describing which windows are visible for the area defined by a requesting view; and
   further wherein the computer system has an individual desktop view zooming capability as well as an object moving capability that may result in desktop expansion.

* * * * *